US009657203B2

(12) United States Patent
Murray et al.

(10) Patent No.: US 9,657,203 B2
(45) Date of Patent: May 23, 2017

(54) ADHESIVE COMPOSITIONS

(71) Applicant: Henkel IP & Holding GmbH, Duesseldorf (DE)

(72) Inventors: James Murray, Newmarket, NH (US); Charles F. Schuft, Boxboro, MA (US); Chih-Min Cheng, Westford, MA (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 14/696,611

(22) Filed: Apr. 27, 2015

(65) Prior Publication Data
US 2015/0225626 A1   Aug. 13, 2015

Related U.S. Application Data

(63) Continuation of application No. PCT/US2013/066063, filed on Oct. 22, 2013.

(60) Provisional application No. 61/718,841, filed on Oct. 26, 2012.

(51) Int. Cl.
| | |
|---|---|
| *C09J 133/12* | (2006.01) |
| *C09J 4/00* | (2006.01) |
| *C09J 163/10* | (2006.01) |
| *C09J 5/06* | (2006.01) |
| *B32B 37/12* | (2006.01) |
| *C09J 163/00* | (2006.01) |
| *C08K 5/08* | (2006.01) |
| *C08K 5/14* | (2006.01) |
| *C08K 5/17* | (2006.01) |
| *C08K 5/50* | (2006.01) |

(52) U.S. Cl.
CPC ............ *C09J 133/12* (2013.01); *B32B 37/12* (2013.01); *C09J 4/00* (2013.01); *C09J 5/06* (2013.01); *C09J 163/00* (2013.01); *C09J 163/10* (2013.01); *B32B 2037/1269* (2013.01); *C08K 5/08* (2013.01); *C08K 5/14* (2013.01); *C08K 5/17* (2013.01); *C08K 5/50* (2013.01); *C09J 2203/10* (2013.01); *C09J 2400/20* (2013.01); *C09J 2433/00* (2013.01); *C09J 2463/00* (2013.01)

(58) Field of Classification Search
CPC .... C09J 133/12; C09J 163/00; C09J 2203/10; C09J 2400/20; C09J 4/00; C09J 163/10; C09J 5/06; C09J 2433/00; C09J 2463/00; B32B 37/12; B32B 2037/1269; C08K 5/08; C08K 5/14; C08K 5/17; C08K 5/50
USPC .......................................... 524/236; 523/438
IPC ............................... B32B 37/12; C09J 133/12
See application file for complete search history.

(56) References Cited

U.S. PATENT DOCUMENTS

| | | | |
|---|---|---|---|
| 4,536,546 A | 8/1985 | Briggs | |
| 6,086,795 A * | 7/2000 | Hatton | C09J 11/06 252/301.21 |
| 6,329,475 B1 * | 12/2001 | Kelly | C08F 283/01 523/442 |
| 6,730,411 B1 * | 5/2004 | Doe | C09J 4/00 428/500 |
| 7,019,075 B2 * | 3/2006 | Righettini | C08F 279/00 524/548 |
| 2003/0171467 A1 | 9/2003 | Kneafsey et al. | |
| 2007/0123653 A1 | 5/2007 | Attarwala et al. | |
| 2008/0017308 A1 | 1/2008 | Dershem | |
| 2012/0028041 A1 | 2/2012 | Koyama et al. | |
| 2012/0114898 A1 | 5/2012 | Kostick et al. | |

FOREIGN PATENT DOCUMENTS

| | | |
|---|---|---|
| CN | 101495377 A | 7/2009 |
| CN | 102585438 A | 7/2012 |
| WO | 2009071704 A2 | 6/2009 |

OTHER PUBLICATIONS

International Search Report for International Application No. PCT/US2013/066063 dated Dec. 30, 2013.

\* cited by examiner

*Primary Examiner* — Michael M Bernshteyn
(74) *Attorney, Agent, or Firm* — Steven C. Bauman

(57) ABSTRACT

A two part curable composition is provided, where the composition comprises:
  (a) a first part comprising:
    (i) a (meth)acrylate component;
    (ii) 1,4-quinones, such as napthoquinone or benzoquinone and derivatives thereof in an amount less than or equal to about 0.05 weight percent;
    (iii) triaryl or alkaryl phenylphosphine in an amount greater than or equal to about 0.5 weight percent; and
    (iv) an amine;
and
  (b) a second part comprising:
    (i) benzoyl peroxide in an amount greater than about 1.0 weight percent.

24 Claims, No Drawings

ADHESIVE COMPOSITIONS

BACKGROUND

Field

A two part curable composition is provided, where the composition comprises:
(a) a first part comprising:
(i) a (meth)acrylate component;
(ii) 1,4-quinones, such as naphthoquinone, anthroquinone or benzoquinone and derivatives thereof in an amount less than or equal to about 0.05 weight percent;
(iii) a tri-aryl or alkylaryl phosphine, such as triphenylphosphine in an amount greater than or equal to about 0.5 weight percent; and
(iv) an amine;
and
(b) a second part comprising:
(i) a peroxide-based oxidant, such as benzoyl peroxide in an amount greater than about 1.0 weight percent.

Brief Description of Related Technology

Acrylic-based adhesive compositions are well known. See e.g. U.S. Pat. No. 4,536,546 (Briggs). While adhesives based on this technology appear to have been sold under the tradename PLEXUS MA 300 and 310 by Illinois Tool Works Inc., Chicago, Ill., they can exhibit an obnoxious odor and they are toxic to handle, which are significant drawbacks to their use.

U.S. Patent Application Publication No. US2010/0065210 provides a sag-resistant composition including: (a) a first part which includes: (i) a (meth)acrylic component, (ii) an amine catalyst; (iii) an optional second catalyst; (iv) a reactive acid component, and (v) a free-radical inhibitor; and (b) a second part which includes: (i) a resin component which includes epoxy groups, (ii) a peroxide; and (iii) a metal compound which complexes with the strong acid component and which is substantially non-reactive with the peroxide. The first and second parts are of sufficiently low viscosity to be easily dispensed with a pumping apparatus. To form this adhesive, the first and second parts are mixed, and immediately after mixing, the mixture is of a higher viscosity, such that the adhesive does not sag, drip, or migrate, after application to a surface within the open time of the mixture, and the mixed first and second parts cure. By the term "open time" is meant the elapsed time between the mixture of the adhesive to the curing.

The desired fast fixturing and good adhesion properties for the assembly of laminates, such as hand held display devices, found with existing commercially available products could be improved, or at least provide the marketplace with alternative products.

SUMMARY

A two part curable composition is provided, where the composition comprises:
(a) a first part comprising:
(i) a (meth)acrylate component;
(ii) 1,4-quinones, such as napthoquinone, anthroquinone or benzoquinone and derivatives thereof in an amount less than of equal to about 0.05 weight percent;
(iii) a tri-aryl or alkylaryl phosphine such as triphenylphosphine in an amount greater than or equal to about 0.5 weight percent; and
(iv) an amine;
and
(b) a second part comprising:
(i) a peroxide-based oxidant, such as benzoyl peroxide in an amount greater than about 1.0 weight percent, desirably up to about 75 weight percent, such as about up to 50 weight percent.

The composition has an open time at room temperature of at least about 2 minutes and a fixture time of less than about 80 seconds at a bondline temperature of 40° C. when used to adhesively join substrates, such as dissimilar ones where one of which being constructed from a plastic like PC/ABS and the other being constructed from a metal like anodized aluminum, and a shelf life of at least one of at a temperature of 38° C. of greater than 4 weeks, such as 6 weeks or more, at a temperature of 55° C. of greater than 3 days, such as 7 days or more, and at a temperature of 82° C. of greater than 7 hours, such as about 24 hours, as measured by manual dispensability through a dual barrel 50 mL syringe.

DETAILED DESCRIPTION

The adhesives so provided are useful for joining substrates, such as dissimilar ones.

These adhesives are described as a two part curable composition is provided, where the composition comprises:
(a) a first part comprising:
(i) a (meth)acrylate component;
(ii) 1,4-quinones, such as napthoquinone, anthroquinone or benzoquinone and derivatives thereof in an amount less than or equal to about 0.05 weight percent;
(iii) a triaryl or alkylaryl phosphine, such as triphenylphosphine in an amount greater than or equal to about 0.5 weight percent; and
(iv) an amine;
and
(b) a second part comprising:
(i) a peroxide-based oxidant, such as benzoyl peroxide in an amount greater than or equal to 1.0 weight percent, desirably up to about 75 weight percent, such as about up to 50 weight percent.

The combination of the first and second parts results in a composition that cures and forms a material suitable for use in the fabrication of laminates. In so doing, the combination has a shelf life at a temperature of 38° C. of greater than 4 weeks, such as 6 weeks or more, at a temperature of 55° C. of greater than 3 days, such as 7 days or more, and at a temperature of 82° C. of greater than 7 hours, such as about 24 hours, as measured by manual dispensability through a dual barrel 50 mL syringe. Thus, the combination of the two parts can be applied to a surface to be laminated, and that surface can be mated to a second surface to form the laminate. The surfaces may be from the same or dissimilar substrates, like those constructed from metals, such as steel and aluminum, plastics, such as PC/ABS and polyarylamides, and ordinarily include one metal and one plastic, though one metal to another metal and one plastic to another plastic is also contemplated. After curing, the composition forms an adhesive bond between the two surfaces.

First Part (Meth)Acrylate Component

Any suitable material which contains at least one group having the following formula:

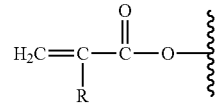

where R is selected from H, halogen, or $C_1$ to $C_{10}$ hydrocarbyl, may be used.

The useful amount of the (meth)acrylate component typically ranges from about 20 weight percent to about 80 weight percent of the total composition. Desirably, the inventive compositions contain from about 50 weight percent to about 70 weight percent of (meth)acrylate component.

At least a portion of the (meth)acrylate component may be isobornyl(meth)acrylate. For instance, about 5 weight percent to about 35 weight percent of the first part composition should be isobornyl(meth)acrylate.

In addition, the (meth)acrylate component may include the free acid version of the monomer. A suitable example includes (meth)acrylic acid or derivatives thereof, which may be present in an amount of about 0.25 weight percent to about 20 weight percent of the first part composition.

The (meth)acrylate component may be present in the form of a polymer, a monomer, or a combination thereof. When present in the form of a polymer, the (meth)acrylate component may be a polymer chain to which is attached at least one of the above-indicated groups. The groups may be located at a pendant or a terminal position of the backbone, or a combination thereof.

Advantageously, at least two such groups may be present, and may be located at terminal positions. The (meth)acrylate component may have a polymer chain constructed from polyvinyl, polyether, polyester, polyurethane, polyamide, epoxy, vinyl ester, phenolic, amino resin, oil based, and the like, as is well known to those skilled in the art, or random or block combinations thereof.

The polymer chain may be formed by polymerization of vinyl monomers. Illustrative examples of such vinyl monomers are methyl (meth)acrylate, ethyl (meth)acrylate, n-propyl(meth)acrylate, isopropyl(meth)acrylate, n-butyl (meth) acrylate, isobutyl(meth)acrylate, tert-butyl (meth)acrylate, n-pentyl(meth)acrylate, n-hexyl(meth)acrylate, cyclohexyl (meth)acrylate, n-heptyl(meth)acrylate, n-octyl(meth)acrylate, 2-ethylhexyl(meth)acrylate, nonyl(meth)acrylate, decyl (meth)acrylate, dodecyl(meth)acrylate, phenyl(meth) acrylate, tolyl(meth)acrylate, benzyl (meth)acrylate, 2-methoxyethyl(meth)acrylate, 3-methoxybutyl(meth)acrylate, 2-hydroxyethyl(meth)acrylate, 2-hydroxypropyl(meth) acrylate, stearyl(meth)acrylate, glycidyl(meth)acrylate, isobornyl(meth)acrylate), 2-aminoethyl(meth)acrylate, γ-(meth)acryloyloxypropyltrimethoxysilane, (meth)acrylic acid-ethylene oxide adduct, trifluoromethylmethyl(meth) acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth)acrylate, perfluoromethyl(meth)acrylate, diperfluoromethylmethyl (meth)acrylate, 2-perfluoromethyl-2-perfluoroethylmethyl (meth)acrylate, 2-perfluorohexylethyl(meth)acrylate, 2-perfluorodecylethyl(meth)acrylate, 2-perfluorohexadecylethyl (meth)acrylate, ethoxylated trimethylolpropane triacrylate, trimethylol propane trimethacrylate, dipentaerythritol monohydroxypentaacrylate, pentaerythritol triacrylate, ethoxylated trimethylolpropane triacrylate, 1,6-hexanedioldiacrylate, neopentyl glycoldiacrylate, pentaerythritol tetraacrylate, 1,2-butylene glycoldiacrylate, trimethylopropane ethoxylate tri(meth)acrylate, glyceryl propoxylate tri(meth) acrylate, trimethylolpropane tri(meth)acrylate, dipentaerythritol monohydroxy penta(meth)acrylate, tri(propylene glycol)di(meth)acrylate, neopentylglycol propoxylate di(meth) acrylate, 1,4-butanediol di(meth)acrylate, polyethyleneglycol di(meth)acrylate, triethyleneglycol di(meth)acrylate, butylene glycol di(meth)acrylate and ethoxylated bisphenol A di(meth)acrylate. These monomers may be used each alone or a plurality of them may be copolymerized.

Particularly desirable (meth)acrylate ester monomers include those where the alcohol portion of the ester group contains 1-8 carbon atoms. For instance, 2-ethylhexyl methacrylate, hydroxyethyl methacrylate, cyclohexyl methacrylate, ethyl methacrylate, 1,3-butanedioldimethacrylate, butyl methacrylate and methyl methacrylate are examples.

1,4-Quinones

Certain 1,4-quinones are useful to stabilize the compositions and provide suitable open times. Naphthoquinone is one such 1,4-quinone; anthroquinone and benzoquinone are others. Naphthoquinone may be used in the first part of the composition in an amount less than or equal to about 0.005 weight percent. Desirably, that amount is less than or equal to about 0.004 weight percent, such as less than or equal to about 0.0035.

In the composition, 1,4-quinone acts as an inhibitor of premature free radical polymerization of the (meth)acrylate component.

Aryl Phosphines

Aryl phosphines include tri(o-tolyl)phosphine, tris(4-methoxyphenyl)phosphine, diphenyl(p-tolyl)phosphine, Diphenyl(o-tolyl)phosphine, tris(o-methoxyphenyl)phosphine, tri(p-tolyl)phosphine, diphenyl(2-methoxyphenyl) phosphine, tris(3,5-dimethylphenyl)phosphine, and of course triphenylphosphine.

Triphenylphosphine is used in the first part of the composition in an amount greater than or equal to about 0.5 weight percent, such as greater than or equal to about 0.75 weight percent.

Surprisingly, in the inventive compositions the use of naphthoquinone in the amount noted above together with triphenyl phosphine in this amount provides for an open time of at least about 2 minutes, such as about 2 minutes to about 3 minutes, together with a fixture time of about 80 seconds or less at a bondline temperature of 40° C. when substrates are to be adhesively joined.

Amines

The inventive compositions include at least one amine that acts as a catalyst by accelerating or otherwise promoting curing of the inventive compositions. The amines desirably are tertiary or sterically hindered. Suitable amines include, for example, tertiary amines represented by the formula $NR_3$, where R is selected from alkyl, aryl, alkaryl, or aralkyl radicals, including $C_{1-10}$ alkyl, $C_{6-18}$ aryl, $C_{7-15}$ alkaryl, and $C_{7-15}$ aralkyl radicals. Suitable hindered amines also include secondary amines, such as $HNR_2$, where R is a $C_{4-10}$ alkyl. For example, alkyl groups such as tertiary butyl, or neopentyl, sterically shield the hydrogen bound to the nitrogen atom, and are suitable substituents in this component. For either tertiary amines or secondary amines, the R groups may be linked so that the nitrogen is embedded within a cyclic structure.

Particularly useful amines for inclusion in the present inventive compositions include, for example, 1,8-diazabicyclo(5.4.0)undec-7-ene (DBU), 1,4-diazabicyclo(2.2.2)octane (DABCO), triethylamine, and substituted guanidines, such as tetramethylguanidine (TMG), toluidines such as dialkyl toluidine like dimethyl-p-toluidine (DMPT), diethyl-p-toluidene (DEPT), dihydroxy ethyl p-toluidine, and dimethyl-o-toluidine (DMOT), anilines such as dialkyl anilines like dimethyl aniline, dihydroxyethyl aniline, acyl thiourea, benzoyl-thiourea, and aryl-thiourea.

The amine can be present in an amount from about 0.01 weight percent to about 5 weight percent. Desirably, the amine is present in an amount from about 0.05 weight percent to about 2 weight percent. More desirably, the amine is present in amount from about 0.3 weight percent to about 0.7 weight percent.

Other Additives

The first part may also include other additives including tougheners and core shell rubbers, lubricants, fillers, thickeners, and coloring agents.

Tougheners include vinyl-terminated polybutadiene, rubbers like ABS rubbers, SBS rubbers, NBR rubbers, and SIS rubbers, and particulate rubber powders, such as core shell rubbers like MBS core shell rubbers, and non-core shell rubbers. For instance, BLENDEX 338 is an ABS powder from GE Plastics.

The vinyl-terminated polybutadienes should be in liquid form at room temperature. The vinyl-terminated polybutadienes should have a glass transition temperature below 0° C. The vinyl-termination may be in the form of (meth)acrylate-termination, for instance (meth)acrylate-terminated polybutadiene-acrylonitrile copolymers such as HYCAR VTBN, or (meth)acrylate-terminated polybutadiene, such as HYCAR VTB, Emerald Performance Polymers. The vinyl-terminated polybutadienes should be present in an amount of up to about 20 weight percent, such as about 5 weight percent to about 15 weight percent.

The core shell polymer is desirably a graft copolymer of the "core shell" type, or may also be a "shell-less" cross-linked rubbery particulate, such as acrylonitrile-butadiene-styrene (ABS), methacrylate-butadiene-styrene (MBS), and methacrylate-acrylonitrile-butadiene-styrene (MABS).

Fillers can provide bulk without sacrificing significant strength of the adhesive and can be selected from high or low density fillers. Also, certain fillers, such as silica, can confer rheological modification or small particle reinforcements. Commercially available examples include CAB-O-SIL 610 and AEROSIL R8200.

Of particular interest are low density fillers, because the resulting final product has an otherwise lower density than a product without the filler, yet has essentially the same range of strength characteristics as if the filler was not present. An example is glass spacer beads, which may or may not be hollow.

Second Part

Benzoyl Peroxide

The second part includes a peroxide-based oxidant, such as benzoyl peroxide in an amount greater than about 1.0 weight percent. Desirably, the amount may be up to about 75 weight percent. Commercially available benzoyl peroxide-containing compositions may also be used. BENOX-50 210 Blue (from Syrgis Performance Initiators, Inc., Helena, Ark.), a peroxide paste believed to contain 49-50% benzoyl peroxide is one desirable choice. BENOX-55 108 White, a peroxide paste believed to contain 54-56% benzoyl peroxide is another desirable choice. Still another desirable choice is VAROX ANS from R.T. Vanderbilt, Norwalk, Conn., a peroxide paste which is believed to contain 55% benzoyl peroxide. Another desirable example is LUPEROX A75 sold by Arkema Corp.

Epoxy Resins

The epoxy resin is an optional component, but when present may include cycloaliphatic epoxides, epoxy novolac resins, bisphenol-A epoxy resins, bisphenol-F epoxy resins, bisphenol-A epichlorohydrin based epoxy resin, alkyl epoxides, limonene dioxides, and polyepoxides.

A desirable resin component is a cycloaliphatic epoxide sold by Dow Chemical under the brand name CYRACURE UVR-6110. UVR-6110 has the following structure:

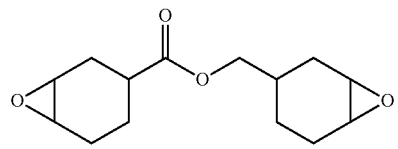 [SMILES: O=C(OCC1CCC2OC2C1)C1CCC2OC2C1]

Another suitable resin component is a bisphenol based liquid epoxy resin, such as those sold under the trade name "D.E.R." by Dow Chemical. For description of these epoxy resins, see http://epoxy.dow.com/epoxy/products/prod/liquid.htm. Examples of "D.E.R." products that are suitable for this invention include D.E.R. 332 (diglycidyl ether of bisphenol-A); D.E.R. 330 (low viscosity, undiluted, bisphenol-A liquid epoxy resin); D.E.R. 383 (low viscosity, undiluted, bisphenol-A liquid epoxy resin); D.E.R. 354 (standard, bisphenol-F based liquid epoxy resin); D.E.R. 351 (low viscosity, liquid bisphenol-A/F resin blend); D.E.R. 352 (low viscosity, liquid bisphenol-A/F resin blend); D.E.R. 324 (aliphatic glycidyl ether reactive diluent, modified liquid epoxy resin); D.E.R. 323 (aliphatic glycidyl ether reactive diluent, modified liquid epoxy resin); D.E.R. 325 (aliphatic glycidyl ether reactive diluent, modified liquid epoxy resin); and D.E.R. 353 (aliphatic glycidyl ether reactive diluent, modified liquid epoxy resin). A different brand of a bisphenol based liquid epoxy resin suitable for use in this invention is EPON™ Resin 828, derived from bisphenol A and epichlorohydrin, and commercially available from Hexion Specialty Chemicals. See http://www.hexionchem.com/pds/E/EPON™ Resin 828.pdf.

Another suitable resin component is an epoxy novolac resin, which are products of epichlorohydrin and phenol-formaldehyde novolac, and sold under the trade name D.E.N. by Dow Chemical. For a description of these epoxy resins, see http://epoxy.dow.com/epoxy/products/prod/nov.htm. Examples of "D.E.N." products that are suitable for this invention include D.E.N. 431 (low viscosity semi-solid epoxy novolac resin); and D.E.N. 438 (semi-solid epoxy novolac resin).

Other suitable epoxy resins include polyepoxides curable with catalyst or hardeners at ambient temperatures or at suitable elevated temperature. Examples of these polyepoxides include polyglycidyl and poly(β-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene)glycols, propane-1,2-diol and poly(oxypropylene)glycols, propane-1,3-diol, butane-1,4-diol, poly(oxytetramethylene)glycols, pentane-1,5-diol, hexane-2,4,6-triol, glycerol, 1,1,1-trimethylolpropane, pentaerythritol, sorbitol, and poly(epichlorohydrin); from cycloaliphatic alcohols, such as resorcinol, quinitol, bis(4-hydroxycyclohexyl)methane, 2,2-bis(4-hydroxycyclohexyl)propane, and 1,1-bis(hydroxymethyl)-cyclohex-3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl)sulphone, 1,1,2,2-tetrabis(4-hydroxyphenyl)ethane, 2,2,-bis(4-hydroxyphenyl)propane (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenols substituted in the ring by chlorine atoms or by alkyl groups each containing up to nine carbon atoms, such as 4-chlorophenol, 2-methylphenol, and 4-t-butylphenol.

Poly(N-glycidyl) compounds include, for example, those obtained by dehydrochlorination of the reaction products of epichlorohydrin with amines containing at least two amino-hydrogen atoms, such as aniline, n-butylamine, bis(4-aminophenyl)methane, and bis(4-methylaminophenyl)methane; triglycidyl isocyanurate; and N,N'-diglycidyl derivatives of cyclic alkylene ureas, such as ethyleneurea and 1,3-propyleneureas, and of hydantoins such as 5,5-dimethylhydantoin.

Epoxide resins having the 1,2-epoxide groups attached to different kinds of hetero atoms may be employed, e.g., the N,N,O-triglycidyl derivative of 4-aminophenol, the glycidyl ether-glycidyl ester of salicylic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

Epoxides derived from oils, such as epoxidized soybean oil, epoxidized castor oil, and the like are also suitable. Epoxides derived from or capable of being derived from the per-acid oxidation of unsaturation are also suitable, including epoxidized liquid rubber.

Plasticizer

Plasticizers are an optional component, but when present may be any liquid or soluble compound that assists with the flexibility of the reactive module of composition and/or may act as a carrier vehicle for other components of the composition. Examples include aromatic sulfonamides, aromatic phosphate esters, alkyl phosphate esters, dialkylether aromatic esters, polymeric plasticizers, dialkylether diesters, polyglycol diesters, tricarboxylic esters, polyester resins, aromatic diesters, aromatic triesters (trimellitates), aliphatic diesters, epoxidized esters, chlorinated hydrocarbons, aromatic oils, alkylether monoesters, naphthenic oils, alkyl monoesters, paraffinic oils, silicone oils, di-n-butyl phthalate, diisobutyl phthalate, di-n-hexyl phthalate, di-n-heptyl phthalate, di-2-ethylhexyl phthalate, 7c9c-phthalate (linear and branched), diisoctyl phthalate, linear 6c,8c,10c phthalate, diisononyl phthalate, linear 8c-10c phthalate, linear 7c-11c phthalate, diisodecyl phthalate, linear 9c-11c phthalate, diundecyl phthalate, diisodecyl glutarate, di-2-ethylhexyl adipate, di-2-ethylhexyl azelate, di-2-ethylhexyl sebacate, di-n-butyl sebacate, diisodecyl adipate, triethylene glycol caprate-caprylate, triethylene glycol 2-ethylhexanote, dibutoxyethyl adipate, dibutoxyethoxyethyl adipate, dibutoxyethoxyethyl formal, dibutoxyethoxyethyl sebacate, tri-2-ethylhexyl trimellitate, tri-(7c-9c(linear))trimellitate, tri-(8c-10c(linear))trimellitate, triethyl phosphate, triisopropyl phenyl phosphate, tributyl phosphate, 2-ethylhexyl diphenyl phosphate, trioctyl phosphate, isodecyl diphenyl phosphate triphenyl phosphate, triaryl phosphate synthetic, tributoxyethyl phosphate, tris(-chloroethyl)phosphate, butylphenyl diphenyl phosphate, chlorinated organic phosphate, cresyl diphenyl phosphate, tris(dichloropropyl)phosphate, isopropylphenyl diphenyl phosphate, trixylenyl phosphate, tricresyl phosphate, and diphenyl octyl phosphate.

Other Additives

The second part may contain other additives, such as fillers, lubricants, thickeners, and coloring agents. The fillers provide bulk without sacrificing significant strength of the adhesive and can be selected from high or low density fillers.

Of particular interest are low density fillers, because the resulting final product has an otherwise lower density than a product without the filler, yet has essentially the same range of strength characteristics as if the filler was not present.

Packaging and Mixing

Each of the first and second parts is packaged in separate containers, such as bottles, cans, tubes, syringes, cartridges or drums.

The first part and the second part are mixed in a ratio of about 1 to 1, 2 to 1, or 10 to 1, by volume.

The mixing of the two parts can employ a mixing nozzle, which has fluid inputs for the two components, performs a suitable mixing operation, and dispenses the adhesive mixture directly onto the surface to be bonded. An example of a commercially available mixing and dispensing device is MIXPAC, available from ConProTec, Salem, N.H. The two parts can also be mixed manually in a bowl, bucket, or the like, but the operator needs to ensure that the mixing is thorough. As an aid to ensuring that mixing is complete, each part can be formulated with a dye or pigment, so that after mixing, a third color is formed. For example, one part may have a yellow dye and the other part may have a blue dye, so that after mixing, the complete adhesive composition will be green.

The curing process of this composition is exothermic, and may reach a temperature of about 120° C., when a large bead of adhesive is used.

After mixing, the so-formed adhesive compositions have an open time of greater than about 2 minutes, such as about 2.75 minutes, and show a fixture time of less than about 80 seconds, such as less than about 60 seconds, desirable about 45 seconds, at a bondline temperature of about 40° C.

EXAMPLES

Example 1

First Part Composition

The components listed in Table 1 for each of the first part compositions were mixed together for a time sufficient to form a sufficiently homogenous mixture. The final first part composition was packed into nylon cartridges.

Second Part Composition

The components listed in Table 1 for the second part components were mixed together for a time sufficient to form a sufficiently homogenous mixture. The final second part composition was packed into nylon cartridges.

Mixing

The first part and the second part were assembled into a 10:1 mix volume MIXPAC nozzle set, and expressed through a mixing nozzle onto the surfaces to be mated. The surfaces to be mated were joined with no surface preparation in a 1" by 0.5" overlap area with a 5 mil bondline, and were allowed to set for a period of time of less than about 80 seconds, in some cases the time was as low as about 45 seconds, at a bondline temperature of 40° C. After cure, shear strength measurements showed values of 1600 to 1800 psi.

The composition was also applied to an anodized aluminum lap shear coupon and mated to a PC-based plastic lap shear coupon with 0.5" overlap. The coupons were placed into a press with a heated upper platen, and compressed to the lower cold platen at about 150 psi. The coupons achieved a fixture strength of greater than 3 kg in less than 45 seconds.

In Table 1 below, the constituents of several two part compositions are presented.

TABLE 1

| Part A | | | | | |
|---|---|---|---|---|---|
| Constituents | | Sample No./Amt (parts) | | | |
| Type | Identity | 1 | 2 | 3 | 4 |
| (Meth)acrylate | Methyl methacrylate/ methacrylic acid | 40.5 | 40.4 | 39.8 | 40.0 |
| | IBOMA | 26.3 | 23.6 | 23.8 | 24.5 |
| | Multifuntional (meth)acrylate* | 1.25 | 1.25 | 1.25 | 0.9 |
| Accelerator | Triphenyl phosphine | 0.8 | 0.8 | 0.8 | 0 |
| Stabilizer | Naphthoquinone | 0.003 | 0.003 | 0.003 | 0 |
| Amine | Toluidine | 1.25 | 1.22 | 1.23 | 1.5 |
| Toughener | Particulate rubber powder | 19.2 | 22.6 | 22.7 | 22.2 |
| | HYPRO VTB** | 9.4 | 10.5 | 9.6 | 10.6 |

| Part B | | |
|---|---|---|
| Constituents | | |
| Type | Identity | Amt (parts) |
| Plasticizer | PEG/Aromatic diol | 30.4 |
| Peroxide | Benzoyl peroxide | 37.0 |
| Epoxy | Bisphenol-A Epoxy | 21.0 |
| Filler | Polyalkylene powder | 11.5 |

*Examples of which are trimethylolpropane triacrylate, SR 351 and zince dimethacrylate, SR 708 from Sartomer, Inc., Exton, PA
**Hypro ™ Reactive Liquid Polymers 2000X168 VTB Methacrylate Terminated Butadiene from CVC Thermoset Specialties, Moorestown, NJ Sample No. 2 achieved an accelerated shelf life at a temperature of 38° C. of 6 weeks, at a temperature of 55° C. of 7 days and at a temperature of 82° C. of greater than 24 hours. Sample No. 2 also showed an open time of about 2.75 minutes.

In Table 2 below, Sample No. 4 (shown in Table 1 above) was used as a first part base mixture with the amount of added TPP varied as shown. The data captured in Table 2 below shows the accelerative effect and stabilizing effect of triphenyl phosphine. As the TPP is increased, the fixture time at the 40° C. bondline temperature is reduced (indicating faster time to react), yet surprisingly, the 82° C. stability is improved from 4 hours to 15 hours.

TABLE 2

| TPP/Amt (wt %) | Open Time (secs) | 82° C. Stability (hours) | 40° C. Fixture Time (secs) |
|---|---|---|---|
| 0 | 255 | 4 | 60 |
| 1.4 | 135 | 15 | 30 |
| 2 | 105 | 15 | 30 |

Table 3 below shows the addition of certain 1,4-quinones in different amounts to Sample No. 2 with the TPP amount maintained at 0.8 parts, and the impact on open time, fixture time and stability under three different accelerated aging conditions.

TABLE 3

| Inhibitor | | Open | 40° C. | Stability | | |
|---|---|---|---|---|---|---|
| Identity | Amt (wt %) | Time (mins) | Fixture Time (secs) | 82° C. (hours) | 55° C. (days) | 38° C. (weeks) |
| — | — | 2-2.5 | 50 | 16 | <7 d | <2 |
| NQ | 0.003 | 2:30 | 60 | >48 | >9 d | >6 |
| NQ | 0.01 | 2:30 | 75 | | | |
| BHT | 0.05 | 3:30 | 120 | | <3 d | |
| BHT | 0.5 | >14 | >120 | | | |
| BQ | 0.003 | 2:30 | 60 | | <3 d | |
| BQ | 0.01 | 2:45 | 75 | | <6 d* | |

*50% viscosity increase observed after 3 days

More specifically, the data in Table 3 demonstrates the surprising stability of the naphthoquinone ("NQ") and benzoquinone ("BQ") stabilizers while at the same time, in conjunction with the accelerating and stabilizing effect of TPP, the ability to maintain the speed of fixturing at a bondline temperature of 40° C. to less than or equal to 80 seconds. BHT, a typical example of a phenolic stabilizer, is twice as slow and still unstable at a temperature of 55° C. even at 17 times the weight of NQ (0.05% BHT v. 0.003% NQ). Higher levels of BHT are even slower, as shown by BHT at 0.5% having an open time greater than 14 minutes.

What is claimed is:

1. A two part curable composition comprising:
   (a) a first part comprising:
      (i) a (meth)acrylate component;
      (ii) a 1,4-quinone in an amount less than or equal to about 0.05 weight percent;
      (iii) triaryl or alkaryl phosphine as an accelerator in an amount greater than or equal to about 0.5 weight percent; and
      (iv) an amine;
   and
   (b) a second part comprising:
      (i) a peroxide-based oxidant.

2. The composition of claim 1, wherein the composition has an open time at room temperature of at least about 2 minutes and a fixture time of less than about 80 seconds at a bondline temperature of 40° C. when used to adhesively join substrates, and a shelf life of at least one of at a temperature of 38° C. of greater than 4 weeks, at a temperature of 55° C. of greater than 3 days and at a temperature of 82° C. of greater than 7 hours, as measured by manual dispensability through a dual barrel 50 mL.

3. The composition of claim 1, wherein the (meth)acrylic component of the first part is selected from the group consisting of methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, isobornyl (meth)acrylate, 2-aminoethyl (meth)acrylate, γ-(meth)acryloyloxypropyl trimethoxysilane, (meth)acrylic acid-ethylene oxide adduct, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, 2-perfluorohexadecylethyl (meth)acrylate, ethoxylated trimethylolpropane triacrylate, trimethylol propane trimethacrylate, dipentaerythritol monohydroxypentacrylate, pentaerythritol triacrylate, ethoxylated trimethylolpropane triacrylate, 1,6-hexanedioldiacrylate, neopentyl glycoldiacrylate, pentaerythritol tetraacrylate, 1,2-butylene glycoldiacrylate, trimethylopropane ethoxylate tri(meth)acrylate, glyceryl propoxylate tri(meth)acrylate, trimethylolpropane tri(meth)acrylate, dipentaerythritol monohydroxy penta(meth)acrylate, tri(propylene glycol) di(meth)acrylate, neopentylglycol propoxylate di(meth)acrylate, 1,4-butanediol di(meth)acrylate, polyethyleneglycol di(meth)acrylate, triethyleneglycol di(meth)acrylate, butylene glycol di(meth)acrylate, ethoxylated bisphenol A di(meth)acrylate, and combinations thereof.

4. The composition of claim 1, wherein the amine of the first part is selected from the group consisting of 1,8-diazabicyclo(5.4.0)undec-7-ene, 1,4-diazabicyclo(2.2.2)octane, triethylamine, tetramethylguanidine, dimethyl-p-toluidine, dimethyl aniline, dihydroxyethyl aniline, dihydroxy ethyl p-toluidine, dimethyl-o-toluidine, dimethyl aniline, benzoyl-thiourea, a trialkyl amine, tributyl amine, dihydro pyridine, phenyl dihydro pyridine, dihydropyridine derivatives, aldehyde condensation products of alkyl, aromatic, heterocyclic amines, and combinations thereof.

5. The composition of claim 1, wherein the amine is a toluidine.

6. The composition of claim 1, further comprising in the first part methacrylic acid.

7. The composition of claim 1, further comprising in the second part an epoxy resin.

8. The composition of claim 7, wherein the epoxy resin of the second part is selected from the group consisting of cycloaliphatic epoxides, epoxy novolac resins, bisphenol-A epoxy resins, bisphenol-F epoxy resins, bisphenol-A epichlorohydrin based epoxy resin, alkyl epoxides, limonene dioxide, polyfunctional epoxides, and combinations thereof.

9. The composition of claim 2, wherein the substrates are each constructed from metals.

10. The composition of claim 2, wherein the substrates are each constructed from plastics.

11. The composition of claim 2, wherein one of the substrates is constructed from a metal and the other is constructed from a plastic.

12. The composition of claim 2, wherein one of the substrates is constructed from anodized aluminum and the other being constructed from PC/ABS.

13. A method of bonding a first surface to a second surface, comprising:
  providing a two part composition comprising:
    (a) a first part comprising:
      (i) a (meth)acrylate component;
      (ii) a 1,4-quinone in an amount less than about 0.05 weight percent;
      (iii) a triaryl or arylalkyl phosphine as an accelerator in an amount greater than or equal to about 0.5 weight percent; and
      (iv) an amine; and
    (b) a second part comprising:
      (i) a peroxide-based oxidant,
  providing a first surface and a second surface;
  applying the two part composition to at least one of the surfaces wherein when the first and second parts are mixed and applied to at least one substrate, the composition shows at least 2 minutes of open time; and
  mating the surface such that the composition shows a fixture time of less than 80 seconds at a bondline temperature of about 40° C. at which point the mated surfaces can support 3 kg load.

14. The composition of claim 1, wherein the peroxide-based oxidant is benzoyl peroxide in an amount greater than about 1.0 weight percent.

15. The composition of claim 1, wherein the peroxide-based oxidant is benzoyl peroxide in an amount up to about 75 weight percent.

16. The composition of claim 1, wherein the 1,4-quinone is naphthoquinone in an amount less than or equal to about 0.005 weight percent.

17. The composition of claim 1, wherein the 1,4-quinone is benzoquinone in an amount less than or equal to about 0.05 weight percent.

18. The composition of claim 2, wherein the composition has a shelf life at a temperature of 38° C. of greater than 6 weeks, at a temperature of 55° C. of greater than 7 days and at a temperature of 82° C. of greater than 24 hours.

19. A two part curable composition comprising:
  (a) a first part comprising:
    (i) a (meth)acrylate component comprising methyl (meth)acrylate;
    (ii) naphthoquinone in an amount less than or equal to about 0.05 weight percent;
    (iii) triphenyl phosphine as an accelerator in an amount greater than or equal to about 0.5 weight percent; and
    (iv) an amine;
  and
  (b) a second part comprising:
    (i) a peroxide-based oxidant.

20. The composition of claim 19, wherein the triphenyl phosphine is present in an amount greater than or equal to about 0.75 weight percent.

21. The composition of claim 1, further comprising in the first part a vinyl-terminated polybutadiene.

22. The composition of claim 1, wherein the vinyl-terminated polybutadiene is in the liquid form at room temperature.

23. The composition of claim 19, further comprising in the first part a vinyl-terminated polybutadiene.

24. The composition of claim 19, wherein the vinyl-terminated polybutadiene is in the liquid form at room temperature.

* * * * *

UNITED STATES PATENT AND TRADEMARK OFFICE
CERTIFICATE OF CORRECTION

PATENT NO. : 9,657,203 B2
APPLICATION NO. : 14/696611
DATED : May 23, 2017
INVENTOR(S) : James Murray et al.

Page 1 of 1

It is certified that error appears in the above-identified patent and that said Letters Patent is hereby corrected as shown below:

In the Specification

Column 1, Line 10: Change "anthroquinone" to -- anthraquinone --.

Column 1, Line 61: Change "anthroquinone" to -- anthraquinone --.

Column 2, Line 27: Change "anthroquinone" to -- anthraquinone --.

Column 3, Line 60: Change "trimethylopropane" to -- trimethylolpropane --.

Column 4, Line 13: Change "anthroquinone" to -- anthraquinone --.

Column 9, Line 14 (Table 1 – Part A (Column - Identity)): Change "Multifuntional" to -- Multifunctional --.

Column 9, Line 36 (Note Below Table 1 – Part B): Change "zince" to -- zinc --.

In the Claims

Column 11, Line 9: Change "trimethylopropane" to -- trimethylolpropane --.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*